(12) United States Patent
Hayashi

(10) Patent No.: US 6,831,798 B2
(45) Date of Patent: Dec. 14, 2004

(54) APPARATUS AND METHOD FOR REPRODUCING FIRST PARTIAL INFORMATION AND READING SECOND PARTIAL INFORMATION, WHICH PERMIT CONTINUOUS REPRODUCTION OF INFORMATION, INFORMATION RECORDING MEDIUM, AND REPRODUCTION PROGRAM

(75) Inventor: Kazuhiro Hayashi, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 351 days.

(21) Appl. No.: 10/107,076

(22) Filed: Mar. 28, 2002

(65) Prior Publication Data

US 2002/0141096 A1 Oct. 3, 2002

(30) Foreign Application Priority Data

Mar. 30, 2001 (JP) .................................... P2001-102223

(51) Int. Cl.$^7$ ............................................... G11B 5/02
(52) U.S. Cl. .......................................... 360/55; 360/12
(58) Field of Search ............................. 360/12, 18, 55, 360/49, 72.2; 386/99, 98, 97, 96, 125; 369/30.09, 30.08, 30.3, 124.07, 124.09, 47.32, 47.31, 47.33, 47.34, 47.47, 47.54

(56) References Cited

U.S. PATENT DOCUMENTS

| | | | | |
|---|---|---|---|---|
| 4,667,314 A | * | 5/1987 | Iwashima | 369/178.01 |
| 5,731,852 A | * | 3/1998 | Lee | 348/719 |
| 6,025,971 A | * | 2/2000 | Inoue et al. | 360/77.08 |

* cited by examiner

*Primary Examiner*—Alan T. Faber
(74) *Attorney, Agent, or Firm*—Sughrue Mion, PLLC

(57) ABSTRACT

A storage device stores a plurality of information, each having first and second partial information. A reading device reads the first partial information of one arbitrarily selected information to be reproduced, and the corresponding first partial information is reproduced. Also, a reading device reads the second partial information of the arbitrarily selected information during the reproduction of the first partial information.

20 Claims, 7 Drawing Sheets

APPARATUS AND METHOD FOR REPRODUCING FIRST PARTIAL INFORMATION AND READING SECOND PARTIAL INFORMATION, WHICH PERMIT CONTINUOUS REPRODUCTION OF INFORMATION, INFORMATION RECORDING MEDIUM, AND REPRODUCTION PROGRAM

BACKGROUND OF THE INVENTION

1. Field of the Invention

The present invention relates to an apparatus and method for reproducing information, an information recording medium and a reproduction program, and more particularly to an apparatus and method for carrying out a reproduction process of information such as musical information in a predetermined reproduction order, a reproduction program used for such a reproduction process and an information recording medium on which the reproduction program has been recorded so as to be readable by a computer.

2. Description of the Related Art

A developmental research of a portable musical information-reproducing device has recently been conducted extensively. With respect to such a device, there exists a musical information-reproducing device provided with a so-called hard disc (a magnetic disc) storage device in which a plurality of musical informations can be stored.

In the conventional musical information-reproducing device provided with such a hard disc storage device, an extended operative period of time of the portable reproducing device, which is given through a power supply unit such as batteries, is required.

In the light of such a fact, there have conventionally been adopted a reproduction system of transferring a musical information recorded on a hard disc storage device to a solid-state storage device such as a semiconductor memory in a data amount corresponding to a predetermined reproduction period of time, without causing the hard disc storage device, which requires a prescribed electric power for driving a hard disc, to always operate. In such a reproduction system, the musical information is read from the solid-state storage device to reproduce it, without operating the hard disc storage device for a while. When an amount of musical information, which has been recorded in the solid state storage device, but has not as yet been reproduced, decreases, the hard disc storage device is operated again to read the other musical information, which is to be reproduced subsequently to reproduction of the musical information that is now stored in the solid state storage device. The thus read other musical information is transferred to the solid-state storage device. These steps are repeated to carry out reproduction of the musical information.

In the above-described reproduction system, the musical information is erased from the solid-state storage device after completion of reproduction of the musical information, so as to be ready for a state in which the next musical information can be transferred.

Such an appropriate use of the hard disc storage device and the solid-state storage device copes with both the continuous reproduction of the musical information and operation of the power supply unit for a long period of time.

Such a musical information-reproducing device having the above-described structure has problems, which may occur in case where a so-called program reproduction is carried out to reproduce musical informations in a predetermined reproduction order. More specifically, in case where the reproduction order is different from the storing order in which informations have been stored in the hard disc storage device, and there is required reproduction of musical information, which has been programmed to carry out reproduction after reproduction of a plurality of the other musical informations, in preference to reproduction of them, a read processing of the musical information to be preferentially reproduced, from the hard disc storage device may be completed so late that the musical information in question cannot be reproduced immediately even when reproduction of the musical information, which is now reproduced, is completed.

The reason for occurrence of the above-mentioned problem is that the musical information to be reproduced is transferred to the solid-state storage device in the reproduction order in accordance with the originally programmed reproduction. Such a system cannot cope with the case where there is required reproduction of musical information in the different order from the reproduction order in the originally programmed reproduction.

In the above-described conventional musical information-reproducing device, the musical information is erased from the solid-state storage device after completion of reproduction of the musical information. If a user desires to reproduce again the musical information, which has already been reproduced, it is necessary to carry out a processing for reading the entirety of the musical information to be reproduced again, from the hard disc storage device and transferring it to the solid state storage device. Consequently, there may occur a problem that reproduction of the musical information to be reproduced again cannot be started immediately.

The above-mentioned problems result in occurrence of the other problem of deteriorating usability of the musical information-reproducing device.

SUMMARY OF THE INVENTION

An object of the present invention, which is made to solve the above-described problems, is therefore to provide an apparatus and method for reproducing information, which permit continuous reproduction of the information in a manner as desired so as to improve usability of the information reproducing apparatus, a reproduction program used for such reproduction and an information recording medium on which the reproduction program has been recorded so as to be readable by a computer.

In order to attain the aforementioned object, an apparatus for reproducing information of the first aspect of the present invention comprises:

a disc type storage device for storing a plurality of informations in a disc-shaped recording medium, each of said plurality of informations including a first partial information and a second partial information following said first partial information;

a solid-state storage device for storing the first partial informations of arbitrarily selected informations to be reproduced of said plurality of informations;

a first partial information reading device for reading out the first partial information of at least one information of said arbitrarily selected informations to be reproduced;

a first partial information reproduction device for reproducing the first partial information thus read out;

a second partial information reading device for reading out the second partial information of said at least one information during reproduction of said first partial information; and a second partial information reproduction device for reproducing the second partial information thus read out.

According to the features of the first aspect of the present invention, it is possible to carry out the continuous reproduction of the musical informations without interruption, thus improving usability of the information reproducing apparatus.

In the second aspect of the present invention, said solid state storage device of the first aspect of the present invention may keep the first partial information stored even after reproduction of said second partial information. According to such a feature, if there is required reproduction of the information as already reproduced, the continuous reproduction of the musical information can be carried out without interruption.

In the third aspect of the present invention, said solid state storage device of the first aspect of the present invention may store not only the first partial information of the information, which is stored in the disc type storage device immediately before the information that is being reproduced, but also the first partial information of the information, which is stored in the disc type storage device immediately after the information that is being reproduced. According to such a feature, even when there is required reproduction of the information, which is stored immediately before or after the information that is being reproduced, it is possible to carry out continuous reproduction of the informations without interruption.

In the fourth aspect of the present invention, said solid state storage device of the first aspect of the present invention may store the first partial information of the informations to be reproduced on a basis of a predetermined reproduction order. Such a feature copes with a demand that continuous reproduction of the informations can be carried out based on the predetermined reproduction order without interruption.

In the fifth aspect of the present invention, said solid state storage device of the first aspect of the present invention may store the first partial information of the informations to be reproduced on a basis of a random reproduction order. Such a feature copes with a demand that continuous reproduction of the informations can be carried out based on the random reproduction order without interruption.

In the sixth aspect of the present invention, preparation for reproduction of the second partial information of said at least one information may be completed during reproduction of the first partial information of the same at least one information, in the first aspect of the present invention. According to such a feature, it is possible to ensure continuity between the first partial information, i.e., the introduction and the second partial information, i.e., the music, thus permitting production of the information in an appropriate manner.

In the seventh aspect of the present invention, said disc type storage device of the first aspect of the present invention may comprise a hard disc; and said solid state storage device thereof may comprise a semiconductor memory. According to such features, a large amount of information can be stored and rapid starting of reproduction of the first partial information can be carried out.

In the eighth aspect of the present invention, said second partial information reproduction device of the first aspect of the present invention may reproduce the second partial information so that the second partial information follows the firs partial information.

In order to attain the aforementioned object, a method for reproducing information of the ninth aspect of the present invention comprises:

a first partial information storing step for storing, from a disc-shaped recording medium storing a plurality of informations, each including a first partial information and a second partial information following said first partial information, said first partial informations of arbitrarily selected informations to be reproduced, into a solid state storage device;

a first partial information reading step for reading out the first partial information of at least one information of said arbitrarily selected informations to be reproduced, from the solid-state storage device;

a first partial information reproduction step for reproducing the first partial information thus read out;

a second partial information reading step for reading out the second partial information of said at least one information from the disc-shaped recording medium during reproduction of said first partial information; and a second partial information reproduction step for reproducing the second partial information thus read out.

According to the features of the ninth aspect of the present invention, it is possible to carry out the continuous reproduction of the musical informations without interruption, thus improving usability of the information reproducing apparatus.

In the tenth aspect of the present invention, the first partial information may be kept stored in said solid state storage device in said first partial information storing step, even after reproduction of said second partial information, in the ninth aspect of the present invention. According to such a feature, if there is required reproduction of the information as already reproduced, the continuous reproduction of the musical information can be carried out without interruption.

In the eleventh aspect of the present invention, preparation for reproduction of the second partial information of said at least one information may be completed during reproduction of the first partial information of the same at least one information, in the ninth aspect of the present invention. According to such a feature, it is possible to ensure continuity between the first partial information, i.e., the introduction and the second partial information, i.e., the music, thus permitting production of the information in an appropriate manner.

In the twelfth aspect of the present invention, said second partial information reproduction step of the ninth aspect of the present invention may be carried out by reproducing the second partial information so that the second partial information follows the firs partial information.

In order to attain the aforementioned object, an information recording medium of the thirteenth aspect of the present invention has a reproduction program recorded therein so as to be readable by a computer, which is included in an information reproducing apparatus comprising a disc type storage device for storing a plurality of informations in a disc-shaped recording medium, each of said plurality of informations including a first partial information and a second partial information following said first partial information; and a solid state storage device for storing the first partial informations of arbitrarily selected informations to be reproduced of said plurality of informations, wherein said reproduction program causes the computer to function as:

a first partial information reading device for reading out the first partial information of at least one information of said arbitrarily selected informations to be reproduced;

a first partial information reproduction device for reproducing the first partial information thus read out;

a second partial information reading device for reading out the second partial information of said at least one information during reproduction of said first partial information; and a second partial information reproduction device for reproducing the second partial information thus read out.

According to the features of the thirteenth aspect of the present invention, it is possible to carry out the continuous reproduction of the musical informations without interruption, thus improving usability of the information reproducing apparatus.

In the fourteenth aspect of the present invention, said solid state storage device may keep the first partial information stored even after reproduction of said second partial information, in the thirteenth aspect of the present invention. According to such a feature, if there is required reproduction of the information as already reproduced, the continuous reproduction of the musical information can be carried out without interruption.

In the fifteenth aspect of the present invention, preparation for reproduction of the second partial information of said at least one information may be completed during reproduction of the first partial information of the same at least one information, in the thirteenth aspect of the present invention. According to such a feature, it is possible to ensure continuity between the first partial information, i.e., the introduction and the second partial information, i.e., the music, thus permitting production of the information in an appropriate manner.

In the sixteenth aspect of the present invention, said second partial information reproduction device of the thirteenth aspect of the present invention may reproduce the second partial information so that the second partial information follows the firs partial information.

In order to attain the aforementioned object, a reproduction program of the seventeenth aspect of the present invention so as to be readable by a computer, which is included in an information reproducing apparatus comprising a disc type storage device for storing a plurality of informations in a disc-shaped recording medium, each of said plurality of informations including a first partial information and a second partial information following said first partial information; and a solid state storage device for storing the first partial informations of arbitrarily selected informations to be reproduced of said plurality of informations, is characterized in that said reproduction program causes the computer to function as:

a first partial information reading device for reading out the first partial information of at least one information of said arbitrarily selected informations to be reproduced;

a first partial information reproduction device for reproducing the first partial information thus read out;

a second partial information reading device for reading out the second partial information of said at least one information during reproduction of said first partial information; and a second partial information reproduction device for reproducing the second partial information thus read out.

According to the features of the seventeenth aspect of the present invention, it is possible to carry out the continuous reproduction of the musical informations without interruption, thus improving usability of the information reproducing apparatus.

In the eighteenth aspect of the present invention, said solid state storage device may keep the first partial information stored even after reproduction of said second partial information, in the seventeenth aspect of the present invention. According to such a feature, if there is required reproduction of the information as already reproduced, the continuous reproduction of the musical information can be carried out without interruption.

In the nineteenth aspect of the present invention, preparation for reproduction of the second partial information of said at least one information may be completed during reproduction of the first partial information of the same at least one information, in the seventeenth aspect of the present invention. According to such a feature, it is possible to ensure continuity between the first partial information, i.e., the introduction and the second partial information, i.e., the music, thus permitting production of the information in an appropriate manner.

In the twentieth aspect of the present invention, said second partial information reproduction device of the seventeenth aspect of the present invention may reproduce the second partial information so that the second partial information follows the firs partial information.

In the present invention, the "first partial information" means a portion of the information and the "second partial information" means the remaining portion thereof. Any one of the "first partial information" and the "second partial information" does not define an amount of information.

DETAILED DESCRIPTION OF THE PREFERRED EMBODIMENTS

Now, preferred embodiments of the present invention will be described in detail below with reference to the accompanying drawings.

In the embodiments described below, the present invention is applied to a portable information reproducing apparatus in which a plurality of musical informations (hereinafter simply referred to as the "pieces of music") is stored in a hard disc storage device, and these pieces of music are temporarily transferred to a semiconductor memory and then outputted.

[I] Fundamental Structure of Information Reproducing Apparatus

Now, a fundamental structure and operation of an information reproducing apparatus of the embodiment of the present invention will be described with reference to FIG. 1.

Figure 1:
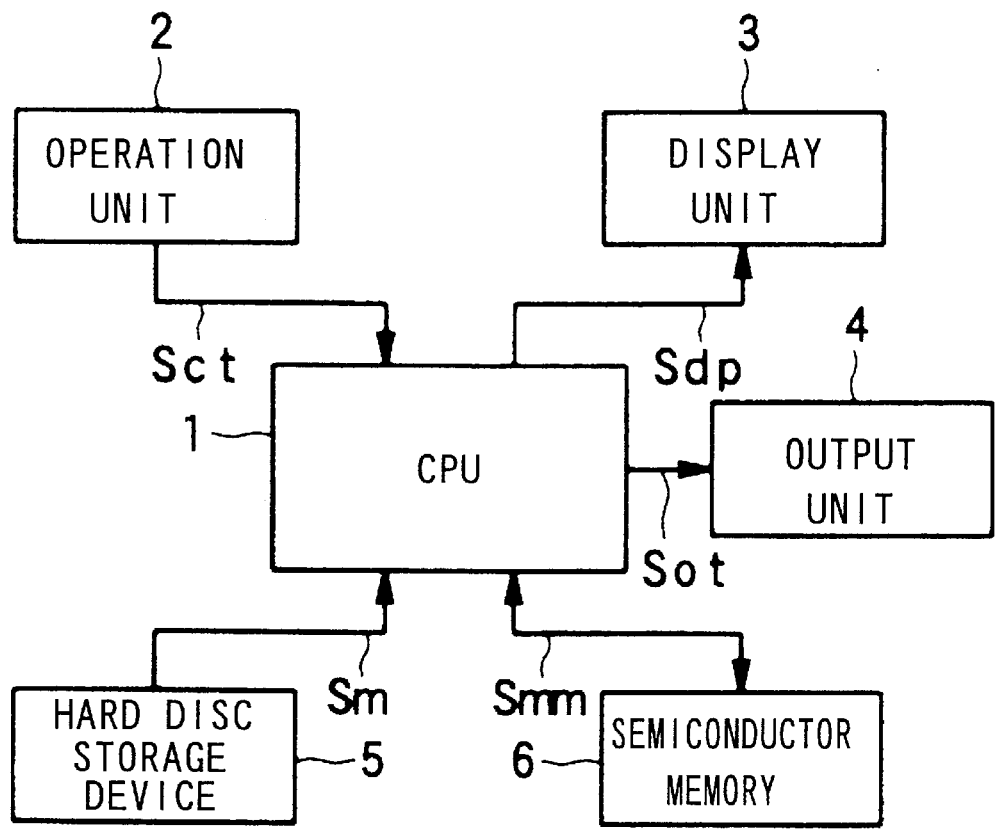
FIG. 1 is a block diagram illustrating a fundamental structure of an information reproducing apparatus of the present invention.

As shown in FIG. 1, the information reproducing apparatus S of the embodiment of the present invention, which serves as a portable information reproducing apparatus having a small size, is composed of a CPU 1, an operation unit 2, a display unit 3, an output unit 4, a hard disc storage device 5 and a semiconductor memory 6. The CPU 1 serves as the first partial information-reading device, the first partial information reproduction device, the second partial information-reading device and the second partial information reproduction device. The hard disc storage device 5 serving as a disc type storage device. The semiconductor memory 6 serves as a solid-state storage device.

Operation of the apparatus S will be described below.

The hard disc storage device 5 stores therein a plurality of pieces of music so as to be identifiable to each other. Each of the plurality of pieces of music, which is also identified as informations, includes the first partial information and the second partial information following the first partial information. Respective music signals Sm of the respective pieces of music are read out and outputted to the CPU 1 under the control thereof.

When contents for processing that is to be conducted by the information reproducing apparatus S, such as a processing for selecting a piece of music to be reproduced, from the pieces of music stored in the hard disc storage device 5 are inputted in the operation unit 2, an operation signal Sct corresponding to the contents as inputted is outputted to the CPU 1.

The CPU 1 transfers the piece of music, which has been read out in the form of music signal Sm from the hard disc storage device 5, to the semiconductor memory 6 on the basis of the contents included in the operation signal Sct, as in the embodiments described below. In addition, the CPU 1 reads out the thus transferred piece of music in the form of music signal Sm from the semiconductor memory 6 and outputs it in the form of output signal Oot to the output unit 4.

The output unit 4 outputs signals to provide a user of the information reproducing apparatus S with musical information contained in the above-mentioned output signal Oot. More specifically, the musical information is given the user through a loudspeaker (not shown). The musical information may be given the user through a headphone or an earphone connected to the output unit 4.

When carrying out the above-mentioned processing, the CPU 1 generates a display signal Sdp including information, which is to be displayed on the display unit 3, and outputs the display signal to the display unit 3. The display unit 3 receives the above-mentioned display signal Sdp to display the information as required.

[II] First Embodiment of Information Reproducing Processing

Now, the information reproducing processing of the first embodiment of the present invention will be described below with reference to FIGS. 1 to 3.

The information reproducing processing described below is carried out in case where only pieces of music, which are selected from stored pieces of music in the hard disc storage device 5 by a user, are reproduced continuously in the storing order.

Figure 2:
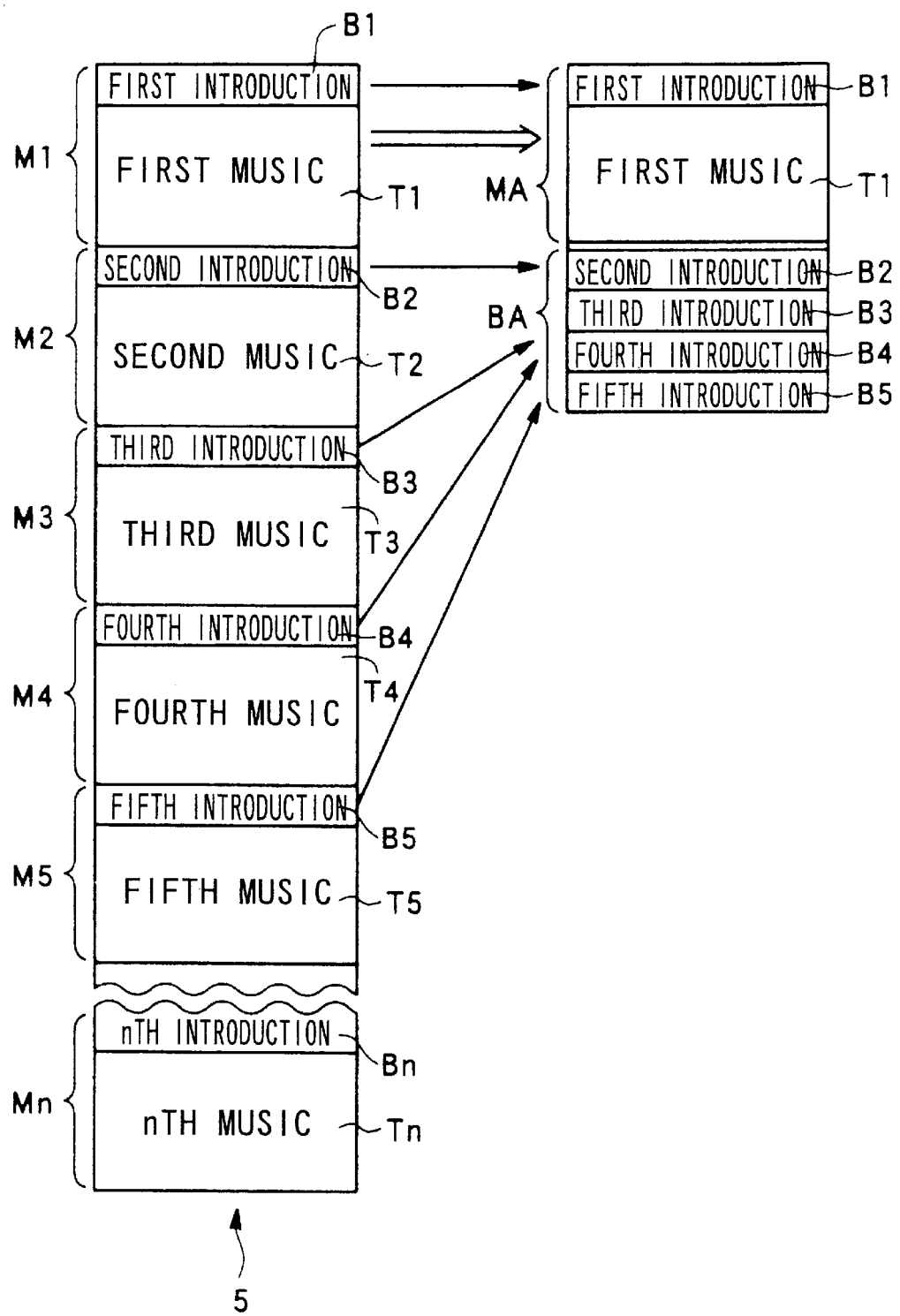
FIG. 2 is a schematic view illustrating an example of an information reproduction processing of the first embodiment of the present invention.

FIG. 2 is a schematic view illustrating a storage pattern according to which the pieces of music are stored in the hard disc storage device 5 as well as a storage pattern according to which the selected pieces of music are stored in the semiconductor memory 6, in the information reproduction processing of the first embodiment of the present invention. FIG. 3 is a flow chart illustrating the information reproduction processing, which is carried out under the control of the CPU 1.

Prior to brief description of the information reproduction processing of the first embodiment of the present invention, description will be given below of the storage pattern according to which the pieces of music are stored in the hard disc storage device 5 with reference to FIG. 2.

As shown in the left-hand side of FIG. 2, "n" pieces of music M1 - - - Mn have been stored in a predetermined order in the hard disc storage device 5 in the first embodiment. The storing order is kept unchanged when executing the information reproduction processing.

Each musical information M, for example, the musical information M1, which is divided into the first introduction B1 and the remaining information, i.e., the first music T1 serving as the second partial information, is stored in the hard disc storage device 5. Each of the introductions, for example, the first introduction B1 includes data, which are required to reproduce the musical information from the head thereof by a predetermined period of reproducing time. The introduction B serves as the first partial information and the music T serves as the second partial information.

The above-mentioned reproducing time for the introduction B serving as the first partial information is equal to or longer than a period of time during which a processing for retrieving the music T in the hard disc storage device 5, a processing for reading out the music T from the hard disc storage device 5, a processing for transferring the music T as read out to the semiconductor memory 6 and a processing for making preparation for reproduction in the semiconductor memory 6 are executed so that these processing are completed during reproduction of data corresponding to the introduction B through the output unit 4.

The semiconductor memory 6 includes a music storage area MA for storing the entirety of the musical information M and an introduction storage area BA for storing only the plurality of introductions B, as shown in the right-hand side of FIG. 2.

Now, the information reproduction processing of the first embodiment of the present invention will be described below with reference to FIGS. 2 and 3.

Figure 3:
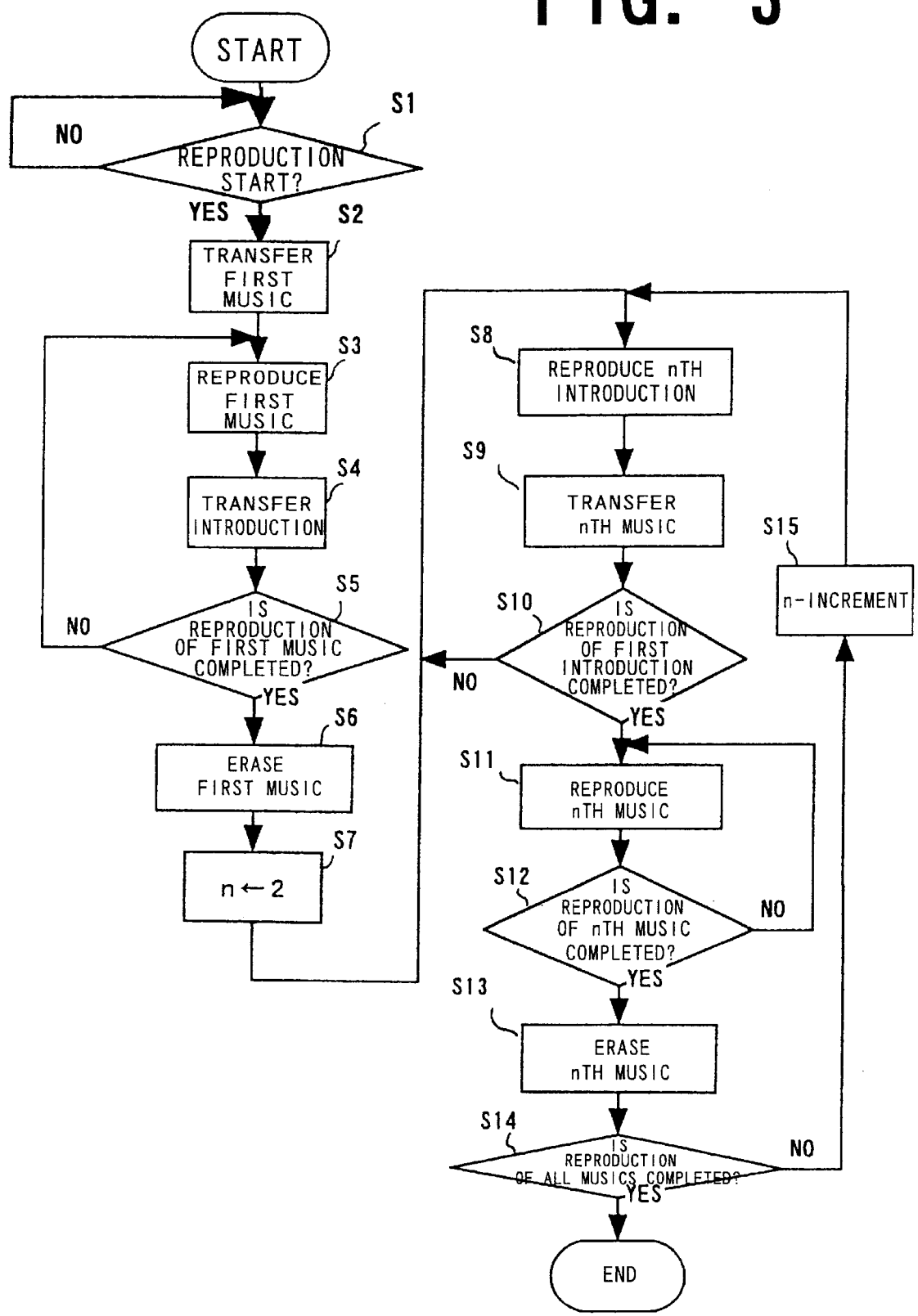
FIG. 3 is a flow chart illustrating the information reproduction processing of the first embodiment of the present invention.

As shown in FIG. 3, in the information reproduction processing of the first embodiment, the CPU 1 first validates whether or not a reproduction starting processing is executed in the operation unit 2 (Step S1). In case where the reproduction starting instruction has not as yet given (i.e., "NO" in Step S1), a standby mode is maintained until the instruction is given. In case where the reproduction starting instruction has been given (i.e., "YES" in Step S1), the first musical information M1, which includes the first introduction B1 and the first music T1 (see the left-hand side of FIG. 2) is read out in the form of music signal Sm from the hard disc storage device 5. The first musical information M1 thus read out is then transferred in the form of music signal Sm to the music storage area MA of the semiconductor memory 6 (Step S2).

Then, outputting the transferred first musical information M1 through the output unit 4 is started (Step S3). Immediately after the start of reproduction of the first musical information M1, the introductions B included in the other musical informations M, which are subsequently reproduced, are read out in the form of music signals Sm from the hard disc storage device 5. The thus read out introductions B are transferred in the form of music signal Sm to the semiconductor memory 6 under the control of the CPU 1 (Step S4).

FIG. 2 illustrates an example in which the musical informations M1 to M5 stored in the hard disc storage device 5 are to be reproduced in this order. When the above-mentioned Step S4 is completed, the introductions B2 to B5 for the other musical informations M2 to M5 than the musical information M1, which is being reproduced, are stored in the introduction storage area BA of the semiconductor memory 6.

Transfer of a required number of introductions B is completed, and then, it is validated whether or not the reproduction of the first musical information M1 is completed (Step S5). When the reproduction of the first musical information M1 is not completed (i.e., "NO" in Step S5), control is returned to Step S3 to execute a continuous reproduction. In such a case, the transfer of the introduction B is completed, resulting in skipping the above-mentioned Step S4.

In validation in Step S5, when the reproduction of the musical information M1 is completed (i.e., "YES" in Step S5), only the first music T1 of the first musical information M1 is erased from the semiconductor memory 6 and the first introduction B1 is transferred from the music storage area MA to the introduction storage area BA (Step S6). In addition, the number "2" is set as a parameter "n" indicating the number of the musical information M to be reproduced next (Step S7).

Then, transfer of the introduction B corresponding to the number of the musical information M, which is indicated by the parameter "n" as set, to the music storage area MA and reproduction of the transferred introduction B from the semiconductor memory 6 are started (Step S8). Then, a processing for retrieving the music T, which is to be reproduced subsequently to the reproduction of the introduction B that is being reproduced now, in the hard disc storage device 5, a processing for reading out the music T from the hard disc storage device 5, a processing for transferring the music T as read out to the semiconductor memory 6 and a processing for making preparation for reproduction in the semiconductor memory 6 are executed (Step S9). The parameter "n" is set at this stage as "2" so that reproduction of the second introduction B2 is started in Step S8 and the transferring processing of the second music T2 is executed in Step S9. In this case, the second music T2 is transferred to the music storage area MA of the semiconductor memory 6, from which the first music T1 has been erased in Step S6.

It is validated whether or not reproduction of the introduction B, which is started in Step S8, is completed (Step S10). In case where the reproduction has not as yet been completed (i.e., "NO" in Step S10), the reproduction of the introduction B continues (Step S8). In such a case, the transfer processing in the above-mentioned Step S9 is completed, resulting in skipping the Step S9. In case where, reproduction of the introduction B, which is started in Step S8, is completed (i.e., "YES" in Step S10), reproduction of the music T, transfer of which has already been completed in Step S9, starts (Step S11).

Then, it is monitored, during the reproduction processing, whether or not the reproduction has been completed (Step S12). In case where the reproduction has not as yet been completed (i.e., "NO" in Step S12), the reproduction processing continues. In case where the reproduction has been completed (i.e., "YES" in Step S12), only the music T of the musical information M, the reproduction of which is started in Step S11, is erased from the semiconductor memory 6 and the introduction B, the reproduction of which has been completed in Step S8, is transferred from the music storage area MA to the introduction storage area BA (Step S13). Then, it is validated whether or not the reproduction of all the musical informations M, the reproduction of which has been instructed (Step S14).

In case where the reproduction of all the musical informations M has been completed (i.e., "YES" in Step S14), the information reproduction processing of the first embodiment of the present invention is terminated. In case where the reproduction of all the musical informations M has not as yet been completed (i.e., "NO" in Step S14), the parameter "n" is incremented by "1" (Step S15) so that the control is returned to above-described Step S8. Consequently, there is executed reproduction processing of the musical information M having the number, which is identical to the parameter "n", which has been incremented in Step S15.

Then, the above-mentioned Steps S8 to S14 are carried out for the musical information M having the number, which is identical to the parameter "n".

When there is required again the reproduction of the first musical information M1, the reproduction of which has already been completed, in the information reproduction processing of the first embodiment, the first music T1 is transferred again from the hard disc storage device 5 to the semiconductor memory 6, during the reproduction of the first introduction B1 stored in the semiconductor memory 6, so as to making preparation for reproduction of the first music T1.

According to the information reproduction processing of the first embodiment as described above of the present invention, the introductions B of the musical informations M, which is to be reproduced in the storing order in the hard disc storage device 5, are previously stored in the semiconductor memory 6 and preparation for reproduction of the music T is made during the reproduction of the introduction B, thus permitting reproduction of the musical information M. In case where there is required continuous reproduction of the plurality of musical informations M, it is unnecessary to read out the musical information M to be reproduced, from the hard disc storage device 5, thus permitting the continuous reproduction of the musical informations M without interruption.

The introduction B of the musical information M, the reproduction of which has already been completed, is kept stored in the semiconductor memory 6. Even when there is required reproduction of the musical information M as already reproduced, the continuous reproduction of the musical informations M without interruption can be carried out.

In addition, the semiconductor memory 6 stores at least two introductions B of the musical informations M, which are stored before and after the musical information as being reproduced now, in the storing order in the hard disc storage device 5. Even when there is required reproduction of the musical information M, which is stored before or after the musical information as being reproduced now, the continuous reproduction of the musical informations M without interruption can be carried out.

Further, the reproducing time for the introduction B is equal to or longer than a period of time during which the processing for retrieving the music T in the hard disc storage device 5, the processing for reading out the music T from the hard disc storage device 5, the processing for transferring the music T as read out to the semiconductor memory 6 and the processing for making preparation for reproduction in the semiconductor memory 6 are executed so that these processing are completed during reproduction of data corresponding to the introduction B. It is therefore possible to ensure continuity between the introduction B and the music T, thus permitting production of the music information M in an appropriate manner.

[III] Second Embodiment of Information Reproducing Processing

Now, the information reproducing processing of the second embodiment of the present invention will be described below with reference to FIGS. 1, 4 and 5.

The information reproducing processing described below is carried out in case where only pieces of music, which are selected by a user, are reproduced continuously in a predetermined (programmed) reproduction order, unlike the first embodiment in which the pieces of music are reproduced continuously in the storing order in the hard disc storage device 5.

Figure 4:
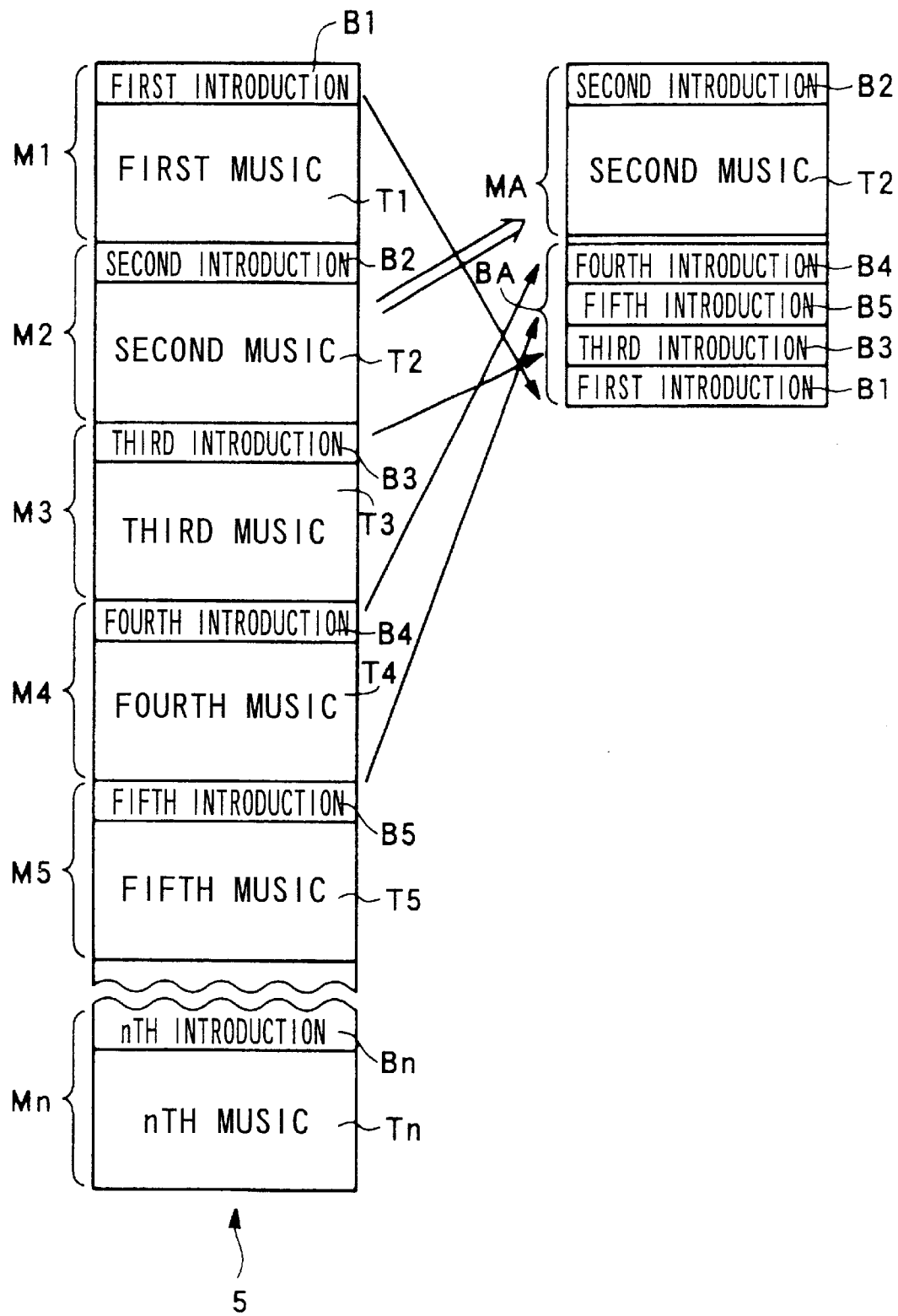
FIG. 4 is a schematic view illustrating an example of the information reproduction processing of the second embodiment of the present invention.

FIG. 4 is a schematic view illustrating a storage pattern according to which the pieces of music are stored in the hard disc storage device 5 as well as a storage pattern according to which the selected pieces of music are stored in the semiconductor memory 6, in the information reproduction processing of the second embodiment of the present invention. FIG. 5 is a flow chart illustrating the information reproduction processing, which is carried out under the control of the CPU 1.

The storage pattern according to which the pieces of music are stored in the hard disc storage device 5 in the second embodiment is the same as that in the first embodiment. Detailed description of the storage pattern is therefore omitted. The introduction B serves as the first partial information and the music T serves as the second partial information in the same manner as the first embodiment.

Figure 5:
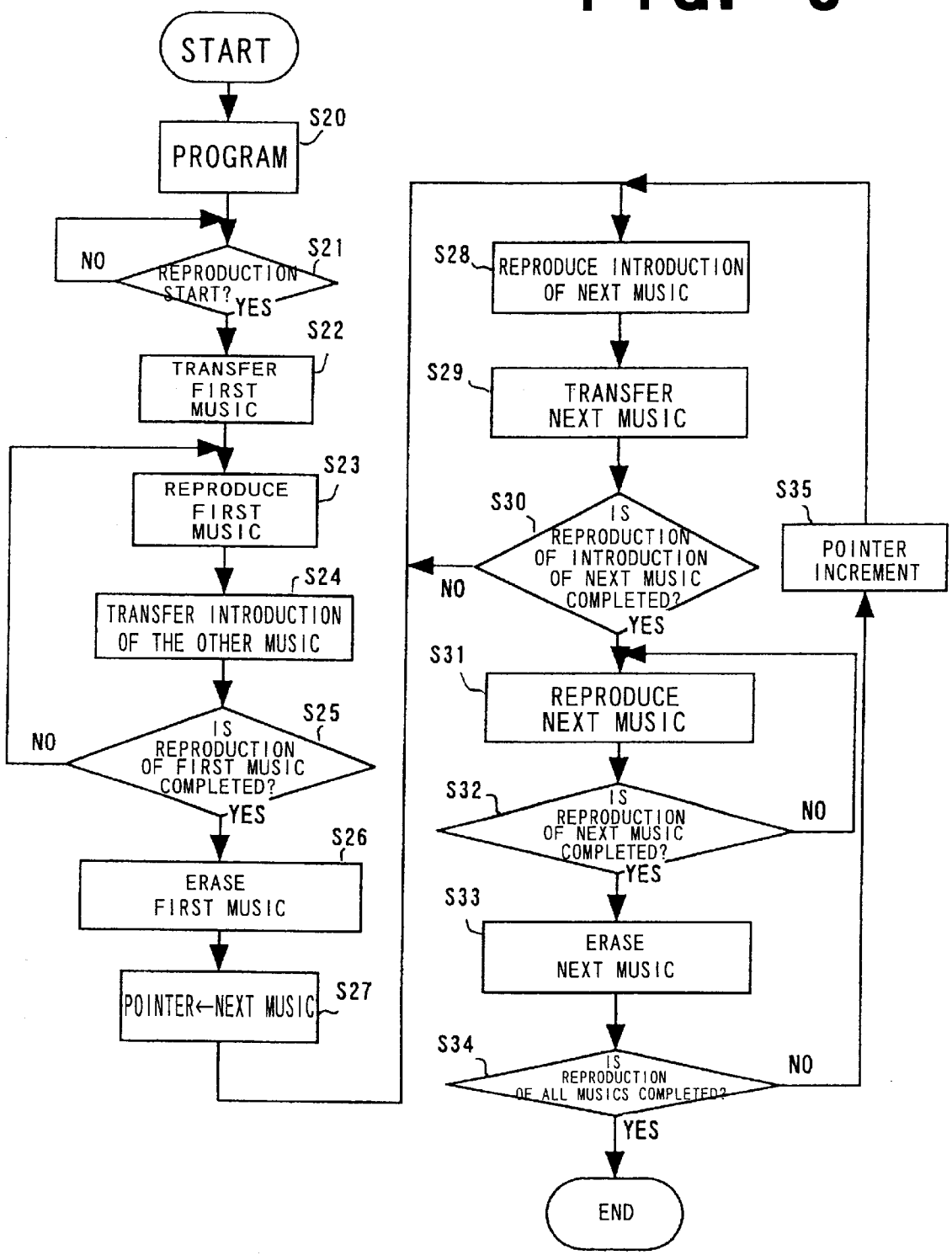
FIG. 5 is a flow chart illustrating the information reproduction processing of the second embodiment of the present invention.

In the information reproduction processing of the second embodiment, musical informations M to be reproduced are first selected from the pieces of music stored in the hard disc storage device 5 and the reproduction order is determined (Step S20) in the operation unit 2, as shown in FIG. 5. Execution of such selection and determination operation is hereinafter referred to as the "programming".

After completion of the programming, the CPU 1 validates whether or not instruction for starting reproduction on the basis of the programmed contents has been given to the operation unit 2 (Step S21). In case where the reproduction starting instruction has not as yet given (i.e., "NO" in Step S21), a standby mode is maintained until the instruction is given. In case where the reproduction starting instruction has been given (i.e., "YES" in Step S21), the musical information M to be reproduced first based on the program is read out in the form of music signal Sm from the hard disc storage device 5. The musical information M thus read out is then transferred in the form of music signal Sm to the semiconductor memory 6 under the control of the CPU 1 (Step S22).

Then, outputting the transferred musical information M through the output unit 4 is started (Step S23). Immediately after the start of reproduction of the musical information M, the introductions B included in the other musical informations M, which are subsequently reproduced on the basis of the program, are read out in the form of music signals Sm from the hard disc storage device 5. The thus read out introductions B are transferred in the form of music signal Sm to the semiconductor memory 6 under the control of the CPU 1 (Step S24).

FIG. 4 illustrates an example in which, of the musical informations stored in the hard disc storage device 5, the five musical informations, i.e., the second musical information M2, the fourth musical information M4, the fifth musical information M5, the third musical information M3 and the first musical information M1 are reproduced in this order. When the above-mentioned Step S24 is completed, the introductions B1, B3 to B5 for the other musical informations M1, M3 to M5 than the musical information M2, which is being reproduced, are stored in the introduction storage area BA of the semiconductor memory 6.

Transfer of a required number of introductions B is completed, and then, it is validated whether or not the reproduction of the second musical information M2 is completed (Step S25). When the reproduction of the second musical information M2 is not completed (i.e., "NO" in Step S25), control is returned to Step S23 to execute a continuous reproduction. In such a case, the transfer of the introduction B is completed, resulting in skipping the above-mentioned Step S24.

In validation in Step S25, when the reproduction of the second musical information M2 is completed (i.e., "YES" in Step S25), only the second music T2 of the second musical information M2 is erased from the semiconductor memory 6 and the second introduction B2 is transferred from the music storage area MA to the introduction storage area BA (Step S26). In addition, the number "4" is set as a parameter "n" indicating the number of the musical information M to be reproduced next (Step S27).

Then, transfer of the introduction B (i.e., the introduction B4 in FIG. 2) corresponding to the number of the musical information M, which is indicated by a pointer as set, to the music storage area MA and reproduction of the transferred introduction B from the semiconductor memory 6 are started (Step S28). Then, a processing for retrieving the music T, which is to be reproduced subsequently to the reproduction of the introduction B that is being reproduced now, in the hard disc storage device 5, a processing for reading out the music T from the hard disc storage device 5, a processing for transferring the music T as read out to the semiconductor memory 6 and a processing for making preparation for reproduction in the semiconductor memory 6 are executed (Step S29). The value of the pointer is set at this stage as "4" so that reproduction of the second introduction B4 is started in Step S28 and the transferring processing of the fourth music T4 is executed in Step S29. In this case, the fourth music T4 is transferred to the music storage area MA of the semiconductor memory 6, from which the second music T2 has been erased in Step S26.

It is validated whether or not reproduction of the introduction B, which is started in Step S28, is completed (Step S30). In case where the reproduction has not as yet been completed (i.e., "NO" in Step S30), the reproduction of the introduction B continues (Step S28). In such a case, the transfer processing in the above-mentioned Step S29 is completed, resulting in skipping the Step S29. In case where, reproduction of the introduction B, which is started in Step S28, is completed (i.e., "YES" in Step S30), reproduction of the music T, transfer of which has already been completed in Step S29, starts (Step S31).

Then, it is monitored, during the reproduction processing, whether or not the reproduction has been completed (Step S32). In case where the reproduction has not as yet been completed (i.e., "NO" in Step S32), the reproduction processing continues. In case where the reproduction has been completed (i.e., "YES" in Step S32), only the music T of the musical information M, the reproduction of which is started in Step S31, is erased from the semiconductor memory 6 and the introduction B, the reproduction of which has been completed in Step S28, is transferred from the music storage area MA to the introduction storage area BA (Step S33). Then, it is validated whether or not the reproduction of all the musical informations M, the reproduction of which has been instructed (Step S34).

In case where the reproduction of all the musical informations M has been completed (i.e., "YES" in Step S34), the information reproduction processing of the second embodiment of the present invention is terminated. In case where the reproduction of all the musical informations M has not as yet been completed (i.e., "NO" in Step S34), the pointer is incremented to indicate the musical information M to be reproduced next based on the program (Step S35) so that the control is returned to above-described Step S28. Consequently, there is executed reproduction processing of the musical information M having the number, which is identical to the pointer, which has been incremented in Step S35.

Then, the above-mentioned Steps S28 to S34 are carried out for the musical information M having the number, which is indicated by the pointer.

When there is required again the reproduction of the second musical information M2, the reproduction of which has already been completed, in the information reproduction processing of the second embodiment, the second music T2 is transferred again from the hard disc storage device 5 to the semiconductor memory 6, during the reproduction of the second introduction B2 stored in the semiconductor memory 6, so as to making preparation for reproduction of the second music T2.

According to the information reproduction processing of the second embodiment as described above of the present invention, the introductions B of the musical informations M, which is to be reproduced in the programmed reproduction order, are previously stored in the semiconductor memory 6 and preparation for reproduction of the music T is made during the reproduction of the introduction B, thus permitting reproduction of the musical information M. In case where there is required continuous reproduction of the plurality of musical informations M, it is unnecessary to read out the musical information M to be reproduced, from the hard disc storage device 5, thus permitting the continuous reproduction of the musical informations M without interruption.

The introduction B of the musical information M, the reproduction of which has already been completed, is kept stored in the semiconductor memory 6. Even when there is required reproduction of the musical information M as already reproduced, the continuous reproduction of the musical informations M without interruption can be carried out.

In addition, the semiconductor memory 6 stores the introductions B of all the musical informations M, which are to be reproduced in the programmed order. Even when the reproduction order is previously programmed, the continuous reproduction of the musical informations M without interruption can be carried out. The semiconductor memory 6 may store the introductions B of a prescribed number of musical informations M, which are to be reproduced in the programmed order.

Further, the reproducing time for the introduction B is equal to or longer than a period of time during which the processing for retrieving the music T in the hard disc storage device 5, the processing for reading out the music T from the hard disc storage device 5, the processing for transferring the music T as read out to the semiconductor memory 6 and the processing for making preparation for reproduction in the semiconductor memory 6 are executed so that these processing are completed during reproduction of data corresponding to the introduction B. It is therefore possible to ensure continuity between the introduction B and the music T, thus permitting production of the music information M in an appropriate manner.

[IV] Third Embodiment of Information Reproducing Processing

Now, the information reproducing processing of the third embodiment of the present invention will be described below with reference to FIGS. 1, 6 and 7.

The information reproducing processing described below is carried out in case where only pieces of music, which are selected by a user, are reproduced continuously in a random reproduction order, unlike the first embodiment in which the pieces of music are reproduced continuously in the storing order in the hard disc storage device 5.

Figure 6:
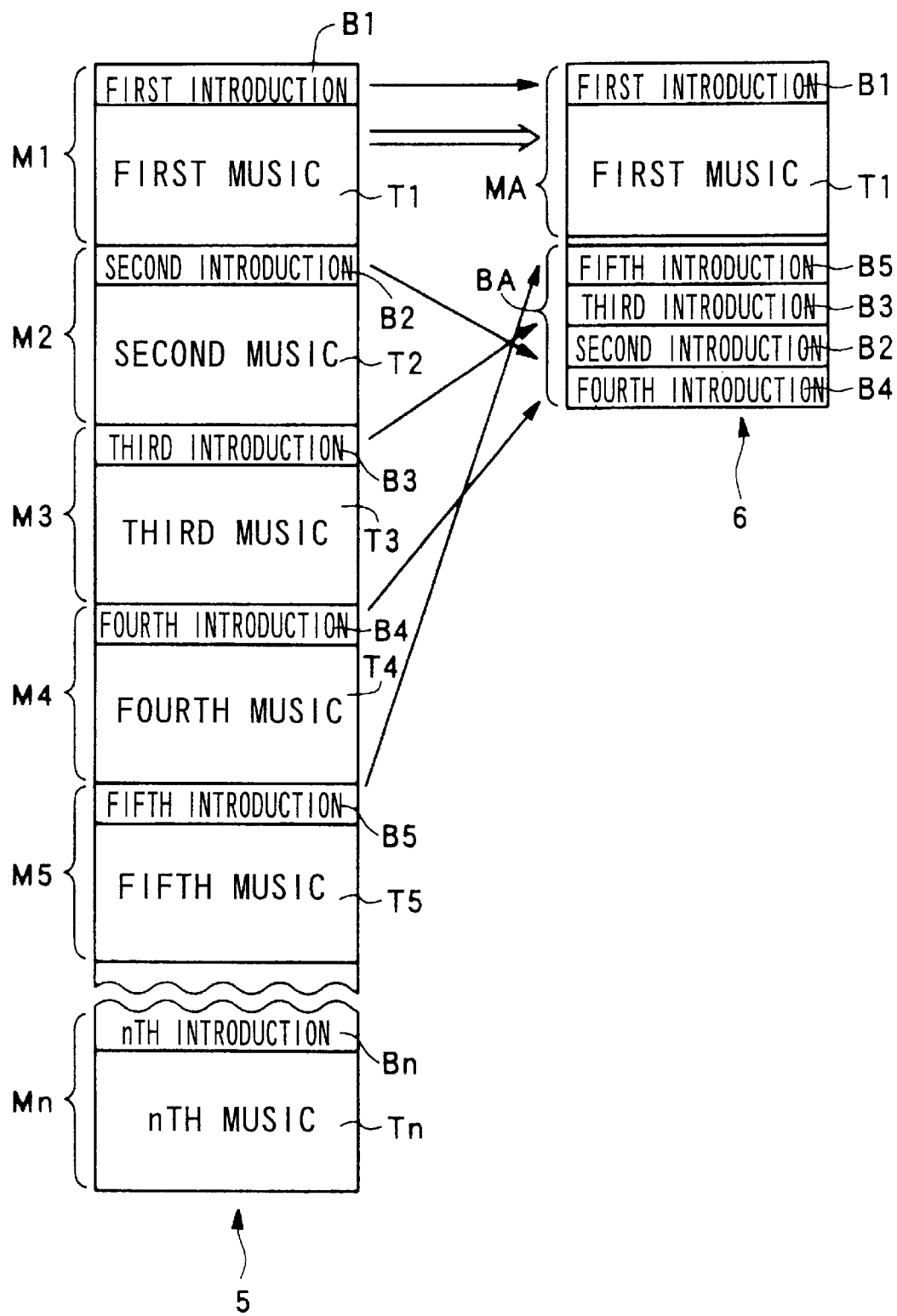
FIG. 6 is a schematic view illustrating an example of the information reproduction processing of the third embodiment of the present invention.

FIG. 6 is a schematic view illustrating a storage pattern according to which the pieces of music are stored in the hard disc storage device 5 as well as a storage pattern according to which the selected pieces of music are stored in the semiconductor memory 6, in the information reproduction processing of the third embodiment of the present invention. FIG. 6 is a flow chart illustrating the information reproduction processing, which is carried out under the control of the CPU 1.

The storage pattern according to which the pieces of music are stored in the hard disc storage device 5 in the third embodiment is the same as that in the first and second embodiments. Detailed description of the storage pattern is therefore omitted. The flow chart as shown in FIG. 7 includes the same steps as shown in FIG. 5. The same step numbers are given to the same steps, respectively, and description of them is omitted. The introduction B serves as the first partial information and the music T serves as the second partial information in the same manner as the first embodiment.

In the information reproduction processing of the third embodiment, operation in the operation unit 2 first causes a random number generator (not shown) to generate random numbers and the musical informations M to be reproduced are selected from the pieces of music stored in the hard disc storage device 5 on the basis of the thus generated random numbers and the reproduction order is determined (Step S40), as shown in FIG. 6.

The same steps as those S21 to S26 in the second embodiment are carried out for the musical information M to be reproduced first on the basis of the reproduction order determined by the random numbers.

FIG. 6 illustrates an example in which, of the musical informations stored in the hard disc storage device 5, the five musical informations, i.e., the first musical information M1, the fifth musical information M5, the third musical information M3, the second musical information M2 and the fourth musical information M4 are reproduced in this order determined by the random numbers. When the above-mentioned Step S24 is completed, the introductions B2 to B5 for the other musical informations M2 to M5 than the musical information M1, which is being reproduced, are stored in the introduction storage area BA of the semiconductor memory 6.

After completion of the above-mentioned step S26, the value of the pointer, which indicates the number of musical information M to be reproduced next on the basis of the reproduction order determined by the random numbers, is set as "5" (Step S41 in FIG. 6).

Then, the same steps as those S28 to S34 in the second embodiment are carried out for the musical information M to be reproduced, which has the same number as that of the pointer.

In case where the reproduction of all the musical informations M has been completed (i.e., "YES" in Step S34), the information reproduction processing of the third embodiment of the present invention is terminated. In case where the reproduction of all the musical informations M has not as yet been completed (i.e., "NO" in Step S34), the pointer is incremented to indicate the musical information M to be reproduced next based on the reproduction order determined by the random numbers (Step S42) so that the control is returned to above-described Step S28. Consequently, there is executed reproduction processing of the musical information M having the number, which is identical to the pointer, which has been incremented in Step S42.

Then, the above-mentioned Steps S28 to S34 are carried out for the musical information M having the number, which is indicated by the pointer.

When there is required again the reproduction of the first musical information M1, the reproduction of which has already been completed, in the information reproduction processing of the third embodiment, the first music T1 is transferred again from the hard disc storage device 5 to the semiconductor memory 6, during the reproduction of the first introduction B1 stored in the semiconductor memory 6, so as to making preparation for reproduction of the first music T1.

According to the information reproduction processing of the third embodiment as described above of the present invention, the introductions B of the musical informations M, which is to be reproduced in the reproduction order determined by the random numbers, are previously stored in the semiconductor memory 6 and preparation for reproduction of the music T is made during the reproduction of the introduction B, thus permitting reproduction of the musical information M. In case where there is required continuous reproduction of the plurality of musical informations M, it is unnecessary to read out the musical information M to be reproduced, from the hard disc storage device 5, thus permitting the continuous reproduction of the musical informations M without interruption.

The introduction B of the musical information M, the reproduction of which has already been completed, is kept stored in the semiconductor memory 6. Even when there is required reproduction of the musical information M as already reproduced, the continuous reproduction of the musical informations M without interruption can be carried out.

In addition, the semiconductor memory 6 stores the introductions B of all the musical informations M, which are to be reproduced in the reproduction order determined by the random numbers. The musical information M corresponding to the introduction B stored in the semiconductor memory 6 is read out from the hard disc storage device 5 in the storing order in the semiconductor memory 6, so as to reproduce the musical information M as read out. Even when the random numbers determines the reproduction order, the continuous reproduction of the musical informations M without interruption can be carried out.

Further, the reproducing time for the introduction B is equal to or longer than a period of time during which the processing for retrieving the music T in the hard disc storage device 5, the processing for reading out the music T from the hard disc storage device 5, the processing for transferring the music T as read out to the semiconductor memory 6 and the processing for making preparation for reproduction in the semiconductor memory 6 are executed so that these processing are completed during reproduction of data corresponding to the introduction B. It is therefore possible to ensure continuity between the introduction B and the music T, thus permitting production of the music information M in an appropriate manner.

In the above-described first to third embodiments of the present invention, the semiconductor memory 6 stores the single music T. The semiconductor memory 6 may however store a plurality of music T in the music storage area MA, depending on the storage capacity of the semiconductor memory 6 and the reproducing time for the introduction B.

Figure 7:
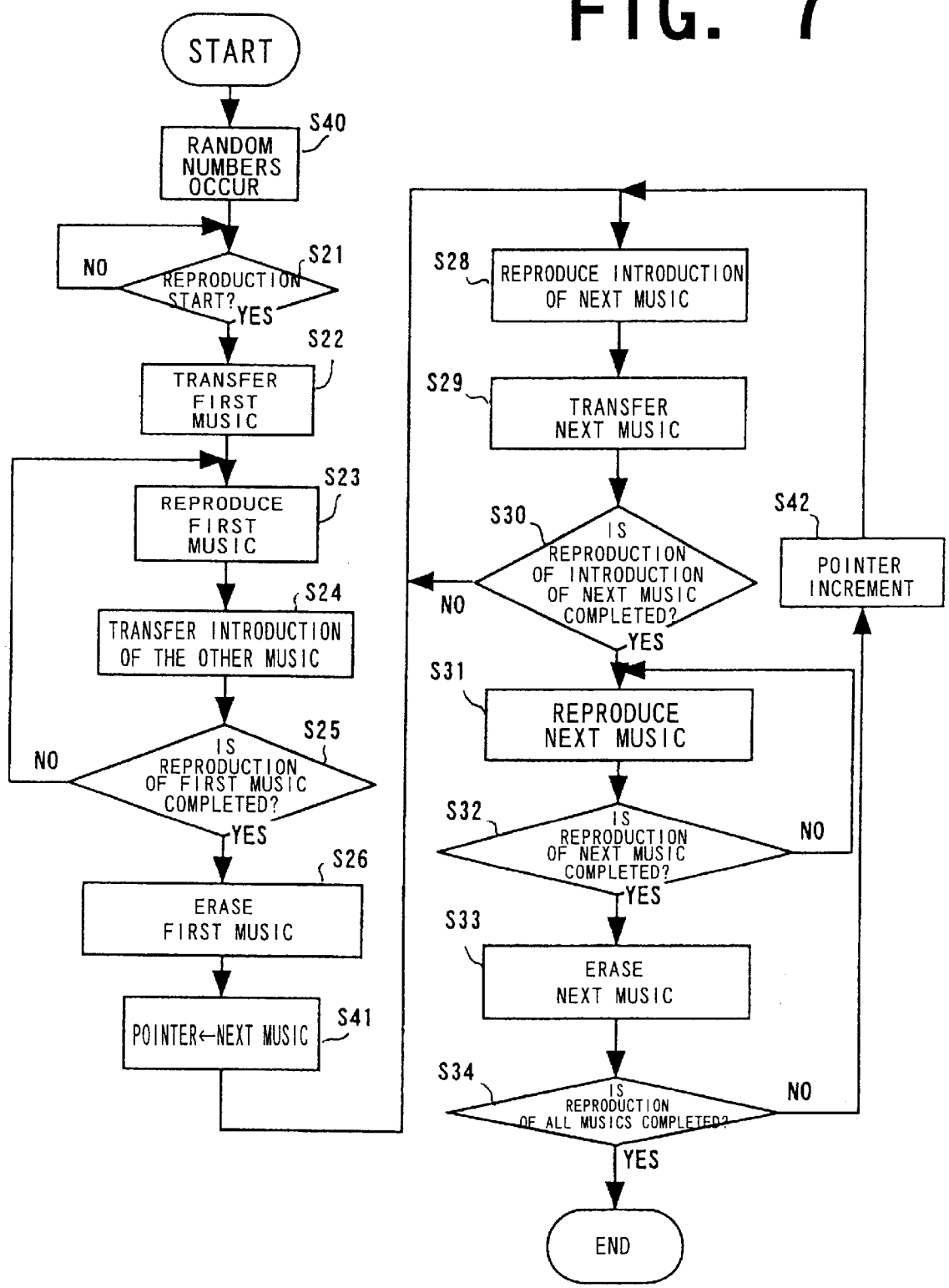
FIG. 7 is a flow chart illustrating the information reproduction processing of the third embodiment of the present invention.

It is possible to store a reproduction program corresponding to each of the flow charts as shown in FIGS. 3, 5 and 7, which are described in the first to third embodiments, in an information recording medium such as a flexible disc or a hard disc, so as to be readable by means of a general computer to execute the reproduction program. In this case, the above-mentioned computer serves as the CPU 1 described in the first to third embodiments of the present invention.

According to the present invention as described in detail, the first partial informations of arbitrarily selected informations to be reproduced, of the plurality of informations are previously stored in the solid state storage device. Preparation of reproduction of the second partial information of at least one information of the arbitrarily selected informations is made during reproduction of the first partial information of the above-mentioned at least one information, permitting continuous reproduction of the information. It is therefore unnecessary to read out the musical information to be reproduced, from the hard disc storage device, thus permitting the continuous reproduction of the musical informations without interruption.

The entire disclosure of Japanese Patent Application No. 2001-102223 filed on Mar. 30, 2001 including the specification, claims, drawings and summary is incorporated herein by reference in its entirety.

What is claimed is:

1. An apparatus for reproducing information, comprising:
   a disc type storage device for storing a plurality of informations in a disc-shaped recording medium, each of said plurality of informations including a first partial information and a second partial information following, said first partial information;
   a solid-state storage device for storing the first partial informations of arbitrarily selected informations to be reproduced of said plurality of informations;
   a first partial information reading device for reading out the first partial information of at least one information of said arbitrarily selected informations to be reproduced;
   a first partial information reproduction device for reproducing the first partial information thus read out;
   a second partial information reading device for reading out the second partial information of said at least one information during reproduction of said first partial information; and
   a second partial information reproduction device for reproducing the second partial information thus read out.

2. The apparatus as claimed in claim 1, wherein:
   said solid-state storage device keeps the first partial information stored even after reproduction of said second partial information.

3. The apparatus as claimed in claim 1, wherein:

said solid-state storage device stores not only the first partial information of the information, which is stored in the disc type storage device immediately before the information that is being reproduced, but also the first partial information of the information, which is stored in the disc type storage device immediately after the information that is being reproduced.

4. The apparatus as claimed in claim 1, wherein:

said solid-state storage device stores the first partial information of the informations to be reproduced on a basis of a predetermined reproduction order.

5. The apparatus as claimed in claim 1, wherein:

said solid-state storage device stores the first partial information of the informations to be reproduced on a basis of a random reproduction order.

6. The apparatus as claimed in claim 1, wherein:

preparation for reproduction of the second partial information of said at least one information is completed during reproduction of the first partial information of the same at least one information.

7. The apparatus as claimed in claim 1, wherein:

said disc type storage device comprises a hard disc; and said solid-state storage device comprises a semiconductor memory.

8. The apparatus as claimed in claim 1, wherein:

said second partial information reproduction device reproduces the second partial information so that the second partial information follows the first partial information.

9. A method for reproducing information, comprising:

a first partial information storing step for storing, from a disc-shaped recording medium storing a plurality of informations, each including a first partial information and a second partial information following said first partial information, said first partial informations of arbitrarily selected informations to be reproduced, into a solid state storage device;

a first partial information reading step for reading out the first partial information of at least one information of said arbitrarily selected informations to be reproduced, from the solid-state storage device;

a first partial information reproduction step for reproducing the first partial information thus read out;

a second partial information reading step for reading out the second partial information of said at least one information from the disc-shaped recording medium during reproduction of said first partial information; and a second partial information reproduction step for reproducing the second partial information thus read out.

10. The method as claimed in claim 9, wherein:

the first partial information is kept stored in said solid-state storage device in said first partial information storing step, even after reproduction of said second partial information.

11. The method as claimed in claim 9, wherein:

preparation for reproduction of the second partial information of said at least one information is completed during reproduction of the first partial information of the same at least one information.

12. The method as claimed in claim 9, wherein:

said second partial information reproduction step is carried out by reproducing the second partial information so that the second partial information follows the first partial information.

13. An information recording medium having a reproduction program recorded therein so as to be readable by a computer, which is included in an information reproducing apparatus comprising a disc type storage device for storing a plurality of informations in a disc-shaped recording medium, each of said plurality of informations including a first partial information and a second partial information following said first partial information; and a solid state storage device for storing the first partial informations of arbitrarily selected informations to be reproduced of said plurality of informations, wherein said reproduction program causes the computer to function as:

a first partial information reading device for reading out the first partial information of at least one information of said arbitrarily selected informations to be reproduced;

a first partial information reproduction device for reproducing the first partial information thus read out;

a second partial information reading device for reading out the second partial information of said at least one information during reproduction of said first partial information; and a second partial information reproduction device for reproducing the second partial information thus read out.

14. The information-recording medium as claimed in claim 13, wherein:

said solid-state storage device keeps the first partial information stored even after reproduction of said second partial information.

15. The information-recording medium as claimed in claim 13, wherein:

preparation for reproduction of the second partial information of said at least one information is completed during reproduction of the first partial information of the same at least one information.

16. The information-recording medium as claimed in claim 13, wherein:

said second partial information reproduction device reproduces the second partial information so that the second partial information follows the first partial information.

17. A reproduction program so as to be readable by a computer, which is included in an information reproducing apparatus comprising a disc type storage device for storing a plurality of informations in a disc-shaped recording medium, each of said plurality of informations including a first partial information and a second partial information following said first partial information; and a solid state storage device for storing the first partial informations of arbitrarily selected informations to be reproduced of said plurality of informations, wherein said reproduction program causes the computer to function as:

a first partial information reading device for reading out the first partial information of at least one information of said arbitrarily selected informations to be reproduced;

a first partial information reproduction device for reproducing the first partial information thus read out;

a second partial information reading device for reading out the second partial information of said at least one information during reproduction of said first partial information; and a second partial information reproduction device for reproducing the second partial information thus read out.

18. The reproduction program as claimed in claim 17, wherein:

said solid-state storage device keeps the first partial information stored even after reproduction of said second partial information.

19. The reproduction program as claimed in claim 17, wherein:

preparation for reproduction of the second partial information of said at least one information is completed during reproduction of the first partial information of the same at least one information.

20. The reproduction program as claimed in claim 17, wherein:

said second partial information reproduction device reproduces the second partial information so that the second partial information follows the first partial information.

* * * * *